(12) United States Patent
Gullickson et al.

(10) Patent No.: US 6,764,404 B1
(45) Date of Patent: Jul. 20, 2004

(54) DRIVE SHAFT COUPLING DEVICE

(75) Inventors: Zan Gullickson, Fort Macleod (CA); Nowal Pierson, Vauxhall (CA)

(73) Assignee: Alberta Ltd., Vauxhall (CA)

( * ) Notice: Subject to any disclaimer, the term of this patent is extended or adjusted under 35 U.S.C. 154(b) by 0 days.

(21) Appl. No.: 09/807,968

(22) PCT Filed: Oct. 29, 1999

(86) PCT No.: PCT/CA99/01000

§ 371 (c)(1),
(2), (4) Date: Jul. 10, 2001

(87) PCT Pub. No.: WO00/26554

PCT Pub. Date: May 11, 2000

(30) Foreign Application Priority Data

Oct. 29, 1998 (CA) ............................................. 2252178

(51) Int. Cl.[7] ................................................ F16D 9/06
(52) U.S. Cl. ............................................ 464/33; 411/4
(58) Field of Search ............................ 464/32, 33, 182; 411/2–5, 389, 398; 280/86.763; 403/2, 337; 417/319; 418/69; 285/368, 412; F16D 1/076

(56) References Cited

U.S. PATENT DOCUMENTS

| 580,607 | A | * | 4/1897 | Thomine ..................... 285/368 |
|---|---|---|---|---|
| 940,098 | A | * | 11/1909 | Wehrle ..................... 285/368 X |
| 1,009,244 | A | * | 11/1911 | Hartsough .............. 411/398 X |
| 1,574,466 | A | * | 2/1926 | Brown |
| 1,704,939 | A | * | 3/1929 | Grauel ................... 411/398 X |
| 2,525,217 | A | * | 10/1950 | Glitsch ................... 411/389 X |
| 4,923,319 | A | * | 5/1990 | Dent ....................... 411/389 X |
| 5,474,408 | A | * | 12/1995 | Dinitz et al. ............ 411/389 X |
| 5,596,845 | A | * | 1/1997 | Strizki |
| 5,651,561 | A | * | 7/1997 | Tandy, Jr. et al. ...... 280/86.753 |
| 5,651,629 | A | * | 7/1997 | Wall et al. ..................... 403/2 |
| 5,697,929 | A | * | 12/1997 | Mellinger .................. 411/5 X |

* cited by examiner

*Primary Examiner*—Greg Binda
(74) *Attorney, Agent, or Firm*—Thomas E. Malyszko

(57) ABSTRACT

An improved drive shaft connecting device, including a novel shear bolt (50) for connecting two ends or flanges (42, 44) of the drive shaft connecting device in a manner whereby the separate parts of the drive shaft connecting device are securely connected to each other and are yet free to disconnect from each other and rotate relative to each other in the case of an overload condition on the drive shaft or drive shaft connecting device. The shear bolt is double ended (i.e. threaded on both ends) and shouldered on both ends. The threads on each end allow the two flanges of the drive shaft coupling device to be pulled together to a pre-determined distance, which, together with a shear point (60), is set by the distance between the opposing shoulders (52) on either side of the shear bolt As well, the flanges of the drive shaft coupling device are designed to accept the shear bolts in slotted openings (46, 48). The shear bolts are designed so that there is a flat area (54) on the shear bolt where it fits into the slots of the drive shaft coupling device, so that the resulting fit of the shear bolt the drive shaft coupling device prevents the shear bolt from rotating within the slot of the drive shaft coupling device. By preventing the shear bolts from rotating, this fitting arrangement allows for easy installation and removal of threaded nuts on the shear bolt.

10 Claims, 4 Drawing Sheets

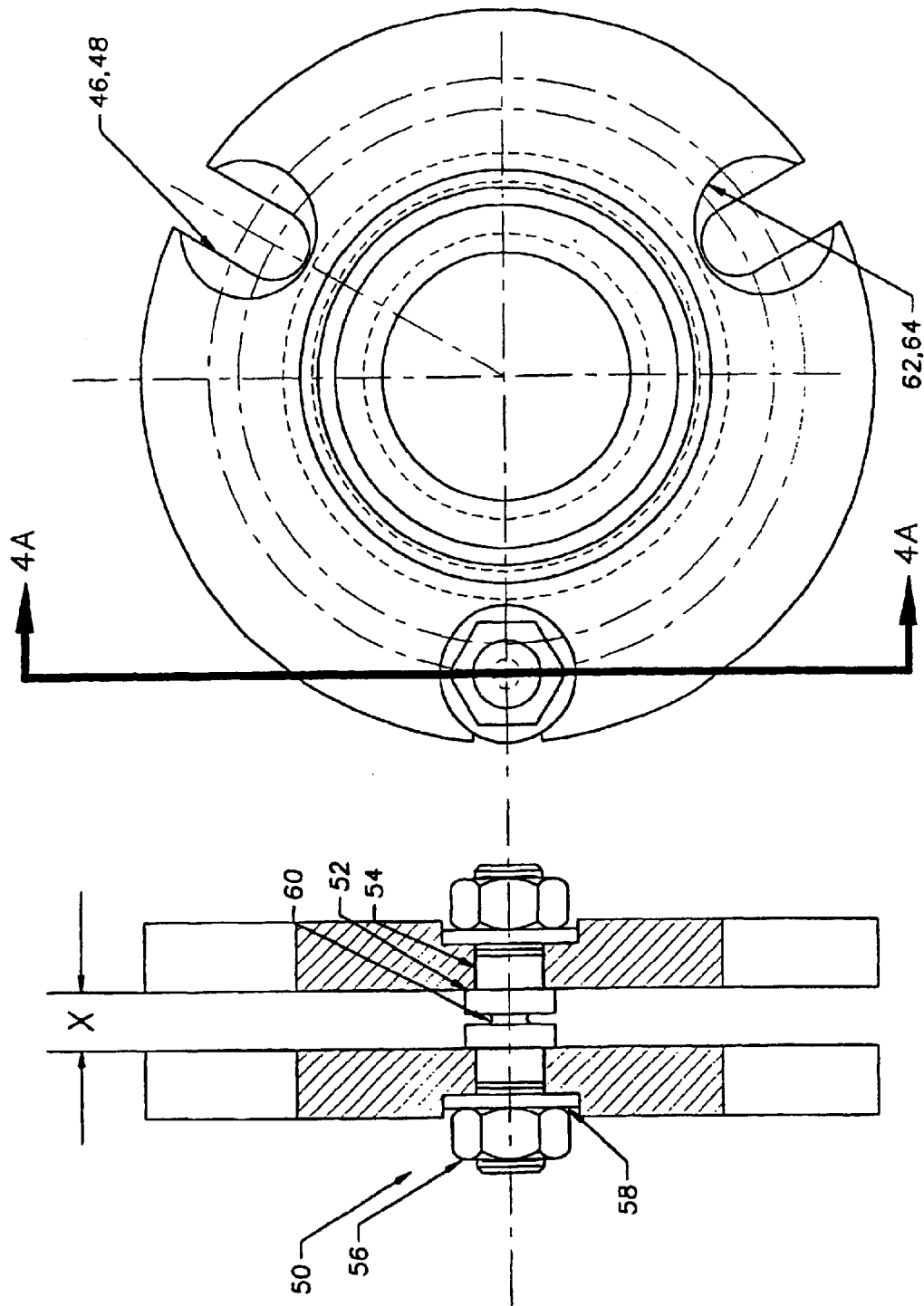

DRIVE SHAFT COUPLING DEVICE

FIELD OF THE INVENTION

The present invention relates to an improved drive shaft coupling device, including an improved shear bolt arrangement for the coupling device.

BACKGROUND OF THE INVENTION

Overload protection devices, as may be installed on rotating drive shafts, must be able to withstand various loads and conditions. It is important that the overload devices connect both ends or members of the drive shaft in such a manner that there is no relative movement between the drive shaft ends, either axial or radial. Upon encountering an overload condition and the consequent rupturing of the shearing connectors, the overload devices should allow the two drive shaft ends to rotate relative to each other consistently at pre-determined torque loads. Previous is designs have not been able to attain consistency of shearing while maintaining absolute relative proximity (i.e. position or spacing) of the two ends of the drive shaft coupling device. In previous designs, the fact that the relative proximity of the ends of the drive shaft coupling device must be maintained has meant that inconsistent friction between the two ends of the coupling device has resulted in inconsistent shearing of the shear pins or bolts.

Inconsistencies in the friction between the two ends of drive shaft coupling devices have several causes, such as improper torque settings of the shear bolts, inconsistent surface finishes of the mating or contacting surfaces of the drive shaft coupling device, or corrosion between the contacting surfaces of the coupling device. Although in theory these inconsistencies might be overcome with conventional shear bolts or pins, in reality it is difficult and impractical.

The novel shear bolt of the present invention, designed in conjunction with novel flanges of the drive shaft coupling device, provide a relative positioning or spacing of the two ends of the drive shaft coupling device, yet allow a consistently controllable shearing of the device in overload conditions. The spacing of the two ends of the drive shaft coupling device is maintained both before and after overload. The designed or desired shear torque of the new drive shaft coupling device is not affected by inconsistencies in the torque settings of the shear bolt nuts, inconsistencies of surface finish in the opposing ends of the drive shaft coupling device, nor by corrosion of the mating or contacting surfaces of the device. With the novel design of the present invention, a desired result is attained consistently and economically.

SUMMARY OF THE INVENTION

The invention provides a device to connect the opposed flanges of a drive shaft coupler in a manner so as to maintain the relative position or spacing of the opposed flanges, and yet allows for consistent and controllable shearing of the connecting shear bolts upon the drive shaft coupler encountering an overload condition.

The present device has a first drive shaft coupler flange and a second drive shaft coupler flange rotatable about a common axis. Each flange has at least two shear bolt retaining slots which may be axially aligned with corresponding shear bolt retaining slots on the other opposing flange.

The device has at least two shearable connectors or bolts, each one threaded from both ends with a shoulder at the end of the threads. Between the two shoulders there is a shear point or area that is turned down on a lathe in order to be of a closely controlled diameter and to be of a lesser shear strength than the rest of the shear bolt. The connectors are to be arranged for balanced common rotation of the first and second drive shaft coupler flanges, and when the connectors shear or rupture upon overload condition of the drive shaft coupler.

The shoulders of shearable connectors provide a means of controlling the distance between the two opposing flanges of the drive shaft coupler as well as providing a surface with which to oppose the tension applied to the shearable connector when tightening the nut on the threads of the connector in order to rigidly affix the connector to the drive shaft coupler flange.

The shearable connectors also have opposing flat surfaces located between the end of the threads and the shoulders of the connector, which flat surfaces fit closely inside the shearable connector retaining slots of the drive shaft connector in order to prevent the shearable connector from rotating when installing or removing the nuts from the ends of the connectors.

The drive shaft coupler flanges also have a circular recessed area on the exposed side of the flange where the nut of the shearable connector contacts the flange. The circular recessed area is of a size to fit a standard flat washer which is in turn the appropriate size to fit the connector. A purpose of the recessed area is to locate the connector at the desired distance from the axial center of the drive shaft coupler.

The device also has a means to seal contaminants and corrosive elements out of the area of the drive shaft coupler where metal parts are in close proximity to each other, and a means to periodically introduce lubrication into the sealed area.

DESCRIPTION OF THE DRAWINGS

FIG. 2a is a cross-sectional view along line 2a—2a of FIG. 2;

FIG. 2b is a cross-sectional view along line 2b—2b of FIG. 2;

FIG. 2c is a cross-sectional view along line 2c—2c of FIG. 2;

FIG. 2d is an end view of the shearable connector of FIG. 2;

FIG. 2e is a top view, in the direction of arrow E, of the shearable connector of FIG. 2;

FIG. 4 is an end view of the coupling device of FIG. 3 with two shearable connectors removed; and, FIG. 4a is a cross-sectional view along line 4a—4a of FIG. 4.

DESCRIPTION OF PREFERRED EMBODIMENTS

Figure 1:
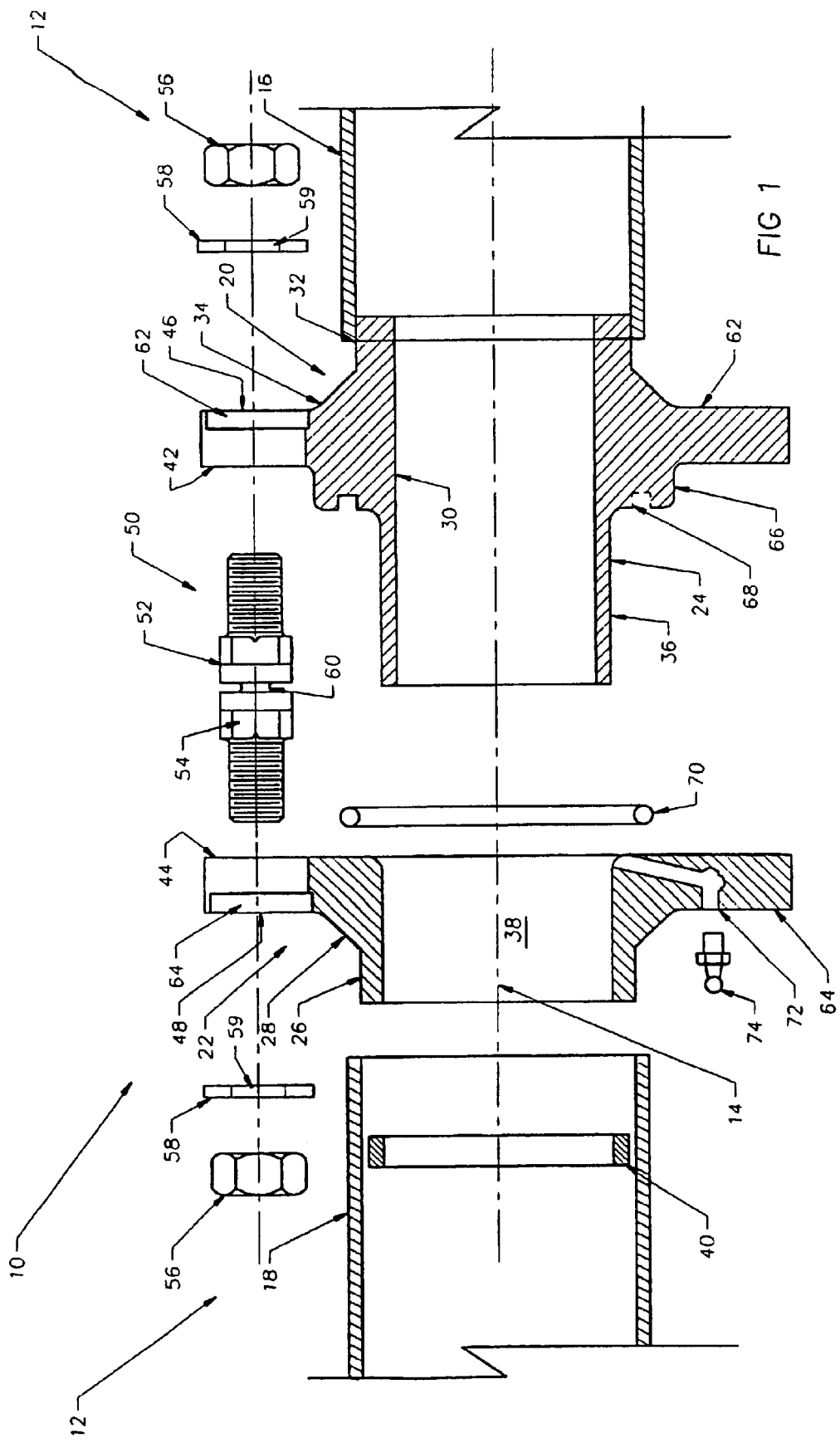
FIG. 1 is and exploded cross-sectional view along fine 1—1 of FIG. 4 of a preferred embodiment of the coupling device of the present invention, and also shows two end sections of a drive shaft.

The figures shows various views of a drive shaft coupling device, generally indicated by the reference number 10, for connecting two ends of a hollow drive shaft 12 which is rotatable about a longitudinal axis 14. The drive shaft coupling device 10 may be factory installed during assembly of the device or vehicle in which it is to be used, or it may be retro-fitted at a later date. Either way, the drive shaft 12 will have first and second sections 16 and 18, respectively, both aligned about the axis 14. For ease of reference, the first and second sections 16, 18 may also be referred to as the right and left sections 16, 18, as viewed in FIG. 1. In its preferred embodiment, the device may be installed and used on any machine requiring the use of a rotating drive shaft where there is a chance of encountering an overload condition and where there could also be a need for the drive shaft to rotate at high speeds, such as up to 2500 RPM or higher.

The coupling device 10 has first and second coupling members, or couplers, indicated by the reference numbers 20 and 22, respectively. For ease of reference, the first and second coupling members 20, 22, may also be referred to as the right and left coupling members 20, 22, as viewed in FIG. 1. The right coupling member 20 is connected to the right drive shaft section 16 and the left coupling member 22 is connected to the left drive shaft section 18. The method of connecting the coupling members 20 and 22 to the drive shaft sections 16 and 18 is normally by welding, but other methods may be used. The right coupling member 20 has a hollow projecting sleeve 32 which is insertable into the end of the right drive shaft section 16 in what is normally a light interference fit. The right drive shaft section 16 abuts the radial inclined area 34 of the coupling member 20. The radial inclined area 34 provides both a firm abutment for the drive shaft 16 as well as providing an suitable area in which to weld together the coupling member 20 and the drive shaft 16. It will be obvious to those skilled in the art that the right drive shaft section 16 may be manufactured integrally with the coupler 20 so as to eliminate the weld in the area of the radial inclined section 34.

In a similar fashion as for the right coupling member 20, the left coupling member 22 has a hollow projecting sleeve 26 which is insertable into the end of the left drive shaft 18 in what is normally a light interference fit. The drive shaft section 18 abuts the radial inclined area 28 of the coupling member 22. The radial inclined area 28 provides both a firm abutment for the drive shaft 18 as well as providing an suitable area in which to weld together the coupling member 22 and the drive shaft 18. It will be obvious to those skilled in the art that the shaft section 18 may be manufactured integrally with the coupler 22 so as to eliminate the weld in the area of the radial inclined section 28.

The right coupling member 20 has another projecting and hollow sleeve 36 opposite the projecting sleeve 32. In the preferred embodiment, the sleeve 36 is hollow in order to reduce rotating weight, although it may be made thicker of solid if desired. The projecting sleeve 36 is axially aligned about the axis 14 in order to fit within a hollow bore 38 of the left coupling member 22 in a close clearance fit. Such fit should be of an appropriate clearance in order to facilitate smooth rotation between the coupler members 20 and 22. The length of the bore 38 in relation to the projecting sleeve 36 is such that the sleeve 36 extends past the bore 38 a suitable s distance to weld or otherwise affix thereon a retaining sleeve 40 which prevents the two coupler sections 20 and 22 from separating upon rupture of the shear bolts 50.

The right and left coupling members 20 and 22 have first and second radially extending flanges 42 and 44, respectively. Each flange 42, 44 has at least two radially extending open-ended slots 46 and 48, respectively, and in the preferred embodiment shown three circumferentially spaced slots 46, 48 are provided, as best seen in FIG. 4. Each slot 46 in the first flange 42 is positioned so that it is directly adjacent to a corresponding slot 48 on the second flange 44.

Figure 2:
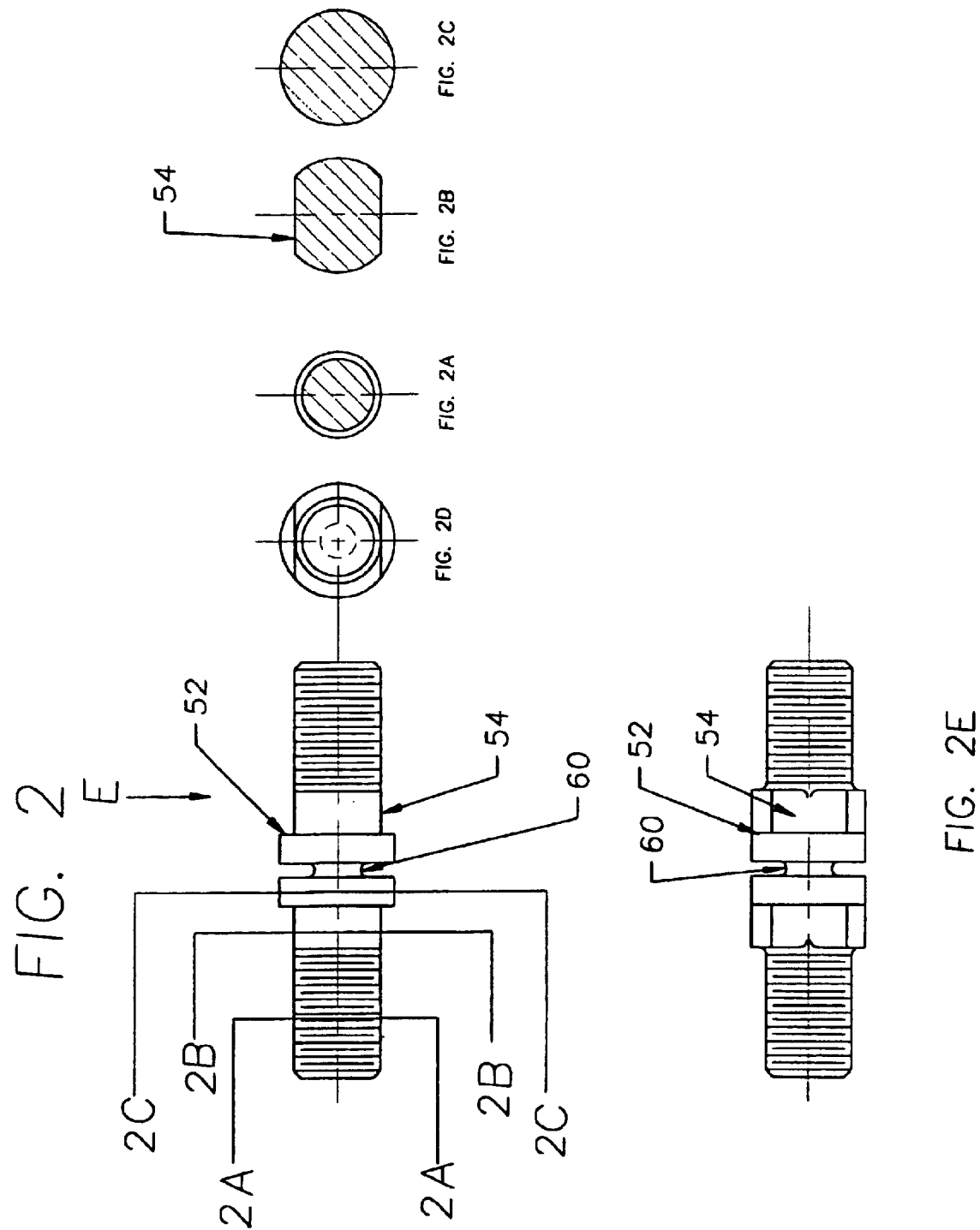
FIG. 2 is a close-up view of a shearable connector of the present invention.
Figure 3:
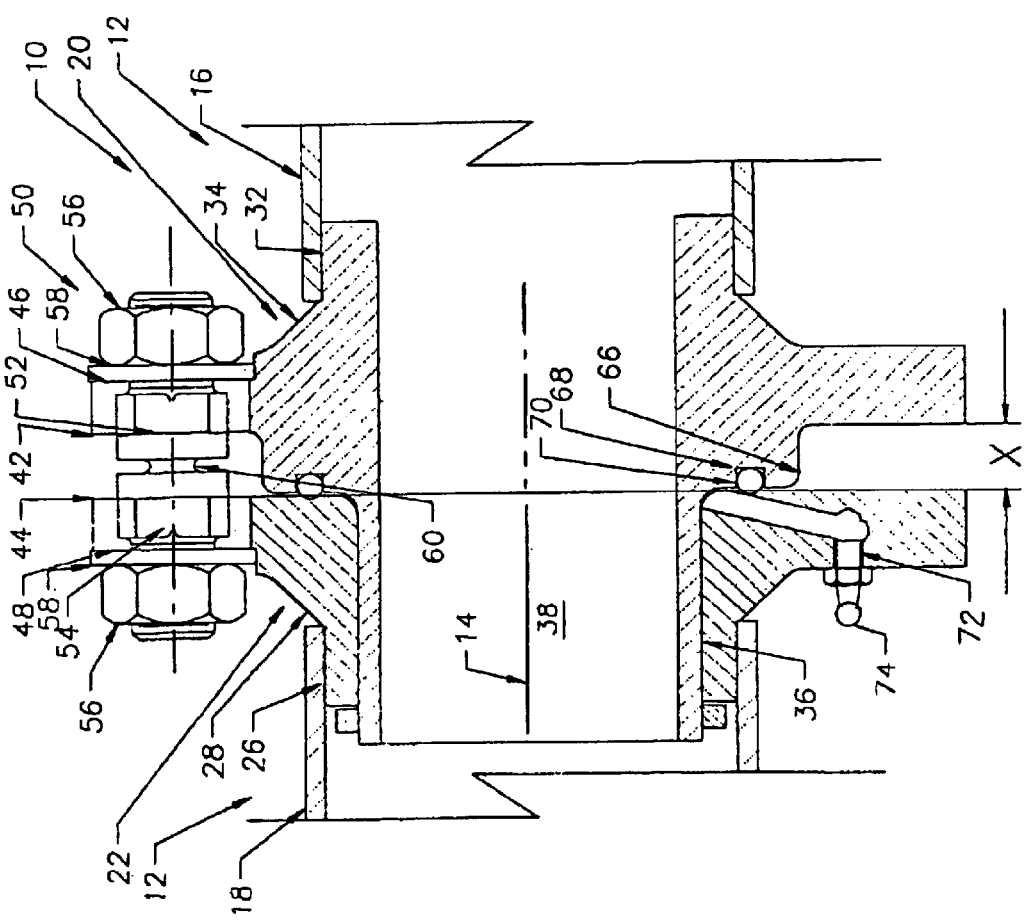
FIG. 3 is a sectional view of the coupling device as in FIG. 1 showing the device assembled and connected to the drive shaft end sections.

An important aspect of the invention arc the shear bolts 50. Each shear bolt 50 fits through the respective slots 46 and 48 of both flanges 42 and 44 concurrently, with the shoulders 52 of the bolt 50 contacting the inside of the flanges 42 and 44. Referring in particular to FIGS. 2 to 2e, each bolt 50 has two opposed flat sides 54 which are a suitable distance apart to form a close clearance fit inside the slots 46 and 48 to allow easy installation and/or replacement and to prevent the shear bolt 50 from rotating within its slot when traded hex nuts 56 are installed. When the shear bolts 50 are inserted into the radial slots 46 and 48 on the flanges 42 and 44, flat washers 58 and lock nuts 56 (or other suitable fasteners) are assembled onto both ends of the shear bolts 50 (see FIGS. 1, 3 & 4a). The nuts 56 are tightened to draw the flanges 42 and 44 together until the shoulders 52 of the shear bolts 50 are in close contact with the inside of the coupler flanges 42 and 44. In doing so, the flanges 42 and 44 arm held at a set distance "X" from each other and are securely connected to one another. The shear bolt 50 also has a shear area 60 or zone between the shoulders 52. This shear zone 60 is turned down on a lathe or other machine in such a way as to provide a shear area that is both much more susceptible t shearing or rupture than the rest of the shear bolt 50 or any other part of the entire coupling device 10 or drive train, and is of a pre-set and controllable diameter to achieve a desired ultimate shear torque of the entire coupling device 10. Hence, one can accurately control the maximum torque at which the bolts 50, and hence the coupling device 10, will shear to break the rotatable connection or link between the drive shaft section 16, 18 so as to avoid damage to the drive shaft from an over-torque situation. The bolts are therefore the equivalent of fuses in an electrical device.

Both flanges 42 and 44 have on their outside faces circular recesses 62 and 64 (see FIGS. 1 & 4) centered radially on the slots 46 and 48. The recesses are of a depth approximately equal to or slightly greater than the thickness of the flat washers 58, and are a predetermined distance from the central axis 14 of the coupler 10. These recesses 62, 64 are sized in their diameter to allow the flat washers 58 to fit inside, therefore positioning the shear bolt 50 a set radial distance from the axis 14. The washer's central aperture or opening 59 (indicated in FIG. 1) also influences the bolt's radial distance from the axis 14. Should a slightly lesser or greater radial spacing from the axis 14 be required for the shear bolt, the location of the aperture 59 in the washer may be suitably altered without changing the design or dimensions of the recesses 62, 64 or any other part of the couplers 20, 22. The recesses 62, 64 also prevent the shear bolts 50 from being thrown outwardly by centrifugal force, particularly should the lock nuts 56 become loosened.

Coupling member 20 also has a radial protrusion 66 (see FIGS. 1 & 3) which in turn has a radial slot 68 for the purpose of keeping or housing a resilient O-ring 70 or other lubricant retaining device. When the flanges 42 and 44 are drawn together as mentioned above, and they are at a set distance from each other, the O-ring 70 forms a seal with the inside of flange 44. The left coupling member 22 also has an internal passageway 72 for introducing grease or other lubricant into the area formed by the clearance fit between the sleeves 36 and 26. The passageway 72 may also have a device to more easily facilitate the introduction of lubricants and to keep dirt out, such as grease nipple 74.

The above description is intended in an illustrative rather than a restrictive sense, and variations to the specific configurations described may be apparent to skilled persons in adapting the present invention to other specific applications. Such variations are intended to form part of the present invention insofar as they are within the spirit and scope of the claims below. For example, the shear bolt 50 may be used to connect many other types of coupling members, whether mechanical or structural types, and rotatable or non-rotatable, which should be designed to shear or otherwise break at a given force. One such use is with highway posts or signs which must give or detach from their support bases, pedestals or legs at given impact forces to reduce or avoid the risk of injury to highway users.

We claim:

1. A shear bolt coupling assembly comprising:

a first coupling member with a first radially extending flange having a planar inside face, an opposed outside face and a plurality of radially extending open-ended slots along a perimeter thereof;

a second coupling member with a second radially extending flange having a planar inside face, and an opposed outside face and a plurality of radially extending open-ended slots along a perimeter thereof, wherein said first and second coupling members are coaxially engaged so as to position said inside faces in a facing relationship;

an elongate shear bolt having a first portion forming a shear area of a given shear strength, a second portion on each side of said first portion forming a shoulder of larger diameter than said first portion for flush engagement with said planar inside face of each of said first and second flanges, and a third portion extending from each of said shoulders adapted to receive a fastening assembly to secure said shear bolt in an aligned pair of said slots in said first and second flanges and thereby securely connect said first and second coupling members for transferring a shear force therebetween up to said given shear strength, said fastening assembly including a stop means for preventing said shear bolt from being urged radially out of said aligned slots by centrifugal force.

2. The assembly of claim 1 wherein said stop means comprises a washer element adapted to register with a recessed portion in a respective outside face of said first or second flange.

3. The assembly of claim 2 wherein said shear area is formed by said first portion of said shear bolt having a turned down profile.

4. The assembly of claim 2 or 3 wherein said third portion of said shear bolt includes opposed planar surfaces adjacent said second portion for slideably engaging any one of said slots in a close clearance fit to avoid rotation of said shear bolt therein.

5. The assembly of claim 4 wherein said washer element further includes an opening for insertion onto said third portion, the location of said opening in said washer element providing a means of adjusting the radial spacing of said shear bolt from a given radial reference point of said first and second coupling members.

6. The assembly of claim 2 or 3 wherein said washer element further includes an opening for insertion onto said third portion of said shear bolt, the location of said opening in said washer element providing a means of adjusting the radial spacing of said shear bolt from a given radial reference point of said first and second coupling members.

7. The assembly of claim 1 wherein said shear area is formed by said first portion of said shear bolt having a turned down profile.

8. The assembly of claim 1 or 7 wherein said third portion of said shear bolt includes opposed planar surfaces adjacent said second portion for slideably engaging any one of said slots in a close clearance fit to avoid rotation of said shear bolt therein.

9. The assembly of claim 8 further including a washer element having an opening for insertion onto said third portion of said shear bolt and adapted to register with a recessed portion in a respective outside face of said first or second flange, wherein the location of said opening in said washer element provides a means of adjusting the radial spacing of said shear bolt from a given radial reference point of said first and second coupling members.

10. The assembly of claim 1 or 7 further including a washer element having an opening for insertion onto said third portion of said shear bolt and adapted to register with a recessed portion in a respective outside face of said first or second flange, wherein the location of said opening in said washer element provides a means of adjusting the radial spacing of said shear bolt from a given radial reference point of said first and second coupling members.

* * * * *

UNITED STATES PATENT AND TRADEMARK OFFICE
CERTIFICATE OF CORRECTION

PATENT NO. : 6,764,404 B1  Page 1 of 1
DATED : July 20, 2004
INVENTOR(S) : Gullickson et al.

It is certified that error appears in the above-identified patent and that said Letters Patent is hereby corrected as shown below:

<u>Title page</u>,
Item [73], Assignee, "Alberta Ltd." should read as -- 648560 Alberta Ltd. --.

Signed and Sealed this

Twenty-third Day of November, 2004

JON W. DUDAS
*Director of the United States Patent and Trademark Office*